United States Patent
Erikson (10) Patent No.: US 7,986,236 B2
(45) Date of Patent: Jul. 26, 2011

(54) RFID TAG AND METHOD AND APPARATUS FOR MANUFACTURING SAME

(75) Inventor: Kenneth R. Erikson, Henniker, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 743 days.

(21) Appl. No.: 11/918,812

(22) PCT Filed: Aug. 24, 2006

(86) PCT No.: PCT/US2006/033111
§ 371 (c)(1),
(2), (4) Date: Oct. 18, 2007

(87) PCT Pub. No.: WO2007/025060
PCT Pub. Date: Mar. 1, 2007

(65) Prior Publication Data
US 2009/0066517 A1    Mar. 12, 2009

Related U.S. Application Data

(60) Provisional application No. 60/711,217, filed on Aug. 25, 2005.

(51) Int. Cl.
  H04Q 5/22    (2006.01)
  G08B 13/14   (2006.01)
  G06F 17/00   (2006.01)
  G06K 19/06   (2006.01)

(52) U.S. Cl. ............... 340/572.1; 340/572.7; 340/572.8; 340/10.1; 340/10.5; 235/375; 235/385; 235/492

(58) Field of Classification Search ............... 340/572.1, 340/572.7, 572.8, 10.1, 10.5; 235/492, 375, 235/385; 29/825, 829, 846; 257/678
See application file for complete search history.

(56) References Cited

U.S. PATENT DOCUMENTS

| | | | | |
|---|---|---|---|---|
| 6,259,408 B1 * | 7/2001 | Brady et al. | ........... | 343/700 MS |
| 6,867,983 B2 * | 3/2005 | Liu et al. | ........... | 361/761 |
| 7,055,756 B2 * | 6/2006 | Anderson et al. | ........... | 235/492 |
| 7,253,735 B2 * | 8/2007 | Gengel et al. | ........... | 340/572.7 |
| 7,531,218 B2 * | 5/2009 | Smith et al. | ........... | 427/346 |
| 7,615,479 B1 * | 11/2009 | Craig et al. | ........... | 438/618 |

* cited by examiner

Primary Examiner — Benjamin C Lee
Assistant Examiner — Lam P Pham
(74) Attorney, Agent, or Firm — Daniel J. Long; Robert K. Tendler (57) ABSTRACT

A Radio Frequency Identification (RFID) tag using multiple microradios and inkjet printing techniques together with a method and system for manufacturing and applying the tag to an end item are disclosed.

18 Claims, 5 Drawing Sheets

RFID TAG AND METHOD AND APPARATUS FOR MANUFACTURING SAME

RELATED APPLICATIONS

This Application claims rights under 35 USC §119(e) from U.S. Application Ser. No. 60/711,217 filed Aug. 25, 2005, the contents of which are incorporated herein by reference.

FIELD OF THE INVENTION

This invention relates to the manufacture of RFID tags and more particularly to the printing of an RFID antenna on a substrate using a conductive fluid, followed by deposition of randomly oriented RFID integrated circuits in a second fluid at the feed point of the antenna, with at least one of the integrated circuits at the feed point properly oriented and connected to the antenna, thus eliminating the need for individual IC orientation, alignment and placement.

BACKGROUND OF THE INVENTION

Radio Frequency Identification (RFID) tags have been utilized extensively to trace pallets of merchandise from a point of shipment to a final destination. The tags are typically passive devices that are read out with RF energy, usually in the 900 MHz range. These passive devices are parasitically powered by the RF energy impinging upon the antenna of the tag, thus powering the integrated circuits within the tag, with the result that the tag transmits the identity of the pallet in response to a probing signal from a reader in the vicinity of the tag.

While such RFID tags are now mandated for pallets in some industries, there is increased level of interest in item-level tagging, which involves placing a tag on the item itself as opposed to on a pallet of items.

However, in order to be able to make such tagging strategies possible for low-value items such as toothpaste and the like, techniques are required to be able to manufacture and deposit the tags on items at an overall cost of no more than 5 cents per item or less.

The relatively low price for the tagging of items is not so important in high-value items such as pharmaceuticals, where the tag price may be as much as 25 or 50 cents from start to finish. Rather, mass merchants are interested in keeping track of how much material is on their shelves for inventory control.

This means that, for short ranges, an individual carries a reader with him- or herself and probes the individual items, either in a walk-by scenario or as the items come into the facility, for instance on a conveyor belt. Also envisioned are so-called "smart shelves", in which the current stock of goods on a merchant's shelves can be remotely monitored and restocked as required.

Note that RFID technology is not merely a bar code technology, but rather one that can store data and, upon request from a reader, output data to a global database. The data can be as simple as a product ID code.

The desideratum using item-level RFID tags is that the whole shipment history of a product from the time it leaves the manufacturing plant to its final destination can be tracked through various hands such as shippers, importers, wholesalers and warehousemen.

If in its simplest embodiment the RFID tag merely contains an identification number, this number is read out along the way during shipment such that the transport history of the item can be ascertained.

It is noted that the current tags are passive tags in that they do not require or have a battery. This is useful because in item-level tagging, low cost is key, there is no space available for batteries and battery shelf life is not a problem.

With respect to tagging of a pallet, it is noted that a pallet is usually placed on a forklift truck and is driven, for instance, into a warehouse where it passes through the warehouse door at which a reader is located. The reader sends out RF energy that charges up the passive tag by transferring energy to the integrated circuits within the tag. The reader then transmits a special code that interrogates the RFID electronics so as to output the tag ID and any other related information stored by the tag.

These passive devices have a range of approximately 30 feet, given the fact that the Federal Communications Commission limits the amount of radiated power from the reader to be 1 watt.

As to the size of the tags that are currently placed on pallets, they are on the order of 2 inches by 2 inches, with the antenna dimensions being the dominating factor. It is noted that the larger the antenna, the greater the range, since a larger tag antenna can capture more energy from a reader. For short-range applications such as monitoring pill bottle inventories, the antenna can be indeed quite small.

Note that with small antennas the amount of energy available for the integrated circuits making up the tag is limited, with the energy being derived from a so-called rectenna that rectifies the RF energy and stores it on a capacitor. In these cases the energy from the capacitor is utilized to power up the circuitry that includes some kind of logic or even a microcomputer as well as a transmitter. Note that once the circuit is powered up the information is transmitted back to the reader.

Using the above tags to identify pallets is commonplace. However, the integrated circuits are relatively expensive, with the integrated circuit tending to be the most expensive part. Secondary to the expense of the integrated circuit itself is the cost involved in building the tag.

If pallets, for instance, contain high value items, a 50- or 75-cent tag may be affordable; however, for item level tags the cost needs to be kept under 5 cents or less.

Moreover, for item-level tags, the output of the transmitter of the RFID tag is in general in the microwatt range due to the small size antenna required. However, with sufficient size reduction there should be a concomitant cost reduction at least of the integrated circuits. If one could make the integrated circuits very, very small, in the tens of micron size, the cost per IC die goes down dramatically. This is because if one can utilize large wafers, one can make millions of individual die per wafer. With processing costs constant and sufficient yields, one can therefore reduce the cost of the tag under 5 cents.

For item-level tags, for instance on individual pill containers, one can arrange to have antennas that are perhaps a quarter of an inch on a side, with a tiny integrated circuit on them. However, even if one could make the micron-sized RFID tags, one is faced with a significant challenge in how to locate an RFID integrated circuit on the associated antenna at its feed point.

In an effort to reduce the cost of the individual chips, manufacturing large numbers of them on a large-size wafer, while theoretically reducing the cost of these chips, the individual chips are extremely hard to test and hard to handle. What is conventionally done now, at least for pallet-level RFID tags, is to use "pick-and-place" machines and size the individual integrated circuits to be at least large enough to enable the pick-and-place operation. Thus, the integrated circuits must be of a size that they can be taken off some kind of dispensing apparatus and physically moved where they can be deposited on and electrically connected to the antenna.

However, pick-and-place machines currently are limited to integrated circuits that are larger than a millimeter on a side.

If one could break through the barrier imposed by pick-and-place machines, for instance utilizing different deposition techniques, then one could garner the cost savings of manufacturing millions of integrated circuits on a single wafer. It would therefore be extremely useful in reducing the overall price of the RFID tag to be able to have integrated circuits as small as a $10^{th}$ of a millimeter on a side. Manufacturing of such small integrated circuits is possible with standard 90-nanometer integrated circuit technology. Even 65-nanometer technology in high volume applications is now state of the art.

However, just because one can lay down patterns that have 90-nanometer line widths or less, a serious limitation is the ability to be able to scribe and break the individual ICs apart from the die. Note that various scribing, breaking, and sawing techniques have been used in the past to separate out individual integrated circuits.

Using sawing, for example, the saw blade dimensions defines the kerf, which is the material that the saw blade requires in the removal of material. Note that in the applications being discussed herein, the kerf is larger than the desired size of the chips. This results in very inefficient use of a wafer and therefore added cost per die.

With laser scribing, smaller kerfs may be available. However, thermal issues limit this type of scribing technique to chip dimensions that are still larger than desirable.

Chemical etching is another alternative method. However, conventional approaches lead to severe undercutting of the die, again adding to the kerf dimensions. There is, however, a unique chemical etching process that limits undercutting in which microscopic die can be formed utilizing standard CMOS processes.

Assuming that one can actually separate out the microscopic chips, mounting them to an antenna can be accomplished through the use of a shaped die and a specially shaped receiver cavity. In such so-called "self-assembly methods", these shaped die are squeegeed over in a slurry across a substrate that has receiver cavities that are adapted to uniquely hold the specially-shaped dies.

This type of self-assembly method, illustrated in U.S. Pat. No. 6,864,570 and licensed to Alien Technology, requires a match between the orientation of the die and the receptacle. Thus the specially shaped ICs have to match the corresponding cavities and if they are randomly oriented in the slurry, they will either not enter the cavity or not be appropriately positioned in the cavity. The result is that the reliability of the RFID tags when manufactured in this and other similar processes often results in failure rates of 5 to 10% that are wholly unacceptable.

In order to eliminate those RFID tags that are inoperative, one must test the tag before applying it to a package, which is another time-consuming and costly procedure that may not be totally successful when microscopic integrated circuit-type tags are involved.

What is therefore needed is first a manufacturing technique for manufacturing RFID tags that reduces the cost of the individual integrated circuit by reducing the size of the integrated circuits; and secondly a technique for coupling the integrated circuits to the feed points of antennas in a way that virtually guarantees a 100% yield while at the same time eliminating the use of pick-and-place machines.

SUMMARY OF INVENTION

In the subject invention, the RFID tag is microminiaturized into what is termed a microradio by first providing an antenna fabricated using an electrically conductive fluid printed or patterned onto a substrate; and then by utilizing a second nonconductive fluid carrying randomly oriented microminiature RFID integrated circuits to deposit these circuits at the feed point of the antenna. Thereafter, conductive fluid that is non-miscible with the conductive fluid is deposited over the nonconductive fluid and the microradios to connect tag contacts that project up through the nonconductive fluid to the antenna. Those tags having contacts that already overlie an antenna feed point, connect to it because they are embedded in the conductive fluid used to print the antenna.

Because a large number of microradios are deposited at the antenna feed point, at least one of the circuits will be properly oriented to the antenna feed point, regardless of the random orientations. This eliminates the problems of pick-and-place machines.

In one embodiment each integrated circuit microradio has conductive tabs or elements in three dimensions on either end of the die, such that when randomly oriented, at least some conductive tabs will be in the appropriate position to contact the antenna feed point. Note these circuits are carried in random orientations with the second fluid such that by virtue of the three-dimensional contact structure and the number of integrated circuits deposited, at least one of the integrated circuits will couple to the feed point of the antenna. Thus the tag may be parasitically powered by energy from the reader and transmit a readable signal to the reader.

In one embodiment, unprogrammed integrated circuits are deposited over the feed points of the antenna such that only those circuits that are appropriately coupled to the feed point of the antenna obtain parasitic powering and are therefore activated. Due to the exceptionally small size of the integrated circuits and due to a specialized three-dimensional integrated circuit fabrication technique in which the edges of the integrated circuit are provided with conductive material or pads on both sides of the circuit, it makes no difference what the random orientation is with respect to the antenna feed, but only that at least one of integrated circuits is sufficiently coupled to the feed point.

The net result is an RFID tag manufacturing technique suitable for item-level labeling in which the overall cost from start to finish for providing a tag on an item is kept below the 5-cent level mentioned above. The system does not require costly and pick-and-place machines that are incapable of handling the micro-sized integrated circuits and does not require specific orientation of the microminiature circuit with respect to any cavity in a substrate to make sure that appropriate connection is made.

Rather, due to the large number of integrated circuits in the fluid, one can assure that at least one integrated circuit will have sufficient coupling to the antenna feed point such that it can be both programmed and activated.

The result is that, with the provision of millions of integrated circuits in a fluid or slurry, one can deposit at least one integrated circuit at the feed point of an antenna and couple to it. This is done without registration problems and without special handling problems.

In summary, the present invention provides a method and system for manufacturing RFID tags. It is also applicable to directly applying a tag to an end item. Using well know integrated circuit techniques, microradios are fabricated with a three-dimensional electrode configuration. Using electrically conductive ink, an antenna is initially deposited on a surface. A plurality of microradios is then dispensed over the feed point of the antenna. Finally, a programming station is used to enable microradios that are correctly coupled to the antenna and to disconnect microradios that are incorrectly connected. The same programming station may be used to program the memory of the tag with information regarding the end item.

BRIEF DESCRIPTION OF THE DRAWINGS

These and other features of the subject invention will be better understood in connection with the Detailed Description, in conjunction with the Drawings, of which.

DETAILED DESCRIPTION

By way of further background, RFID tags are becoming a well-established method for tracking materials during shipping and storage. In many applications they replace the printed bar code labels on items because they do not require a close proximity for the automatic reader. RFID tags that conform to the ISO/IEC 18000 standard also can contain significantly more data than a printed bar code label and can be modified en route to include waypoint or other information.

Present RFID tags cost about $US 0.50 (50 cents) and are usually fabricated by electrically bonding a custom integrated circuit (IC) to a substrate containing a printed circuit antenna. The usual fabrication method, well known in the electronics industry is flip-chip bonding. An electrically conductive solder paste, such as a conductive epoxy is applied to the appropriate places on the antenna. A "pick and place" machine picks up the IC die and places it onto the substrate in the proper location with respect to the antenna connections. The conductive epoxy then self-cures or is heated to expedite the curing process, thereby mechanically and electrically bonding the die to the antenna. The substrate may have an adhesive backing for eventual manual or machine application to the end item.

The common wisdom in the RFID industry is the cost of the tags must be less than $US 0.05 (5 cents) for the widespread adoption. Cost is the key driver for the application. With the economy of scale of integrated circuits, the cost of an individual RFID die of the required size can be very low. The cost of the antenna on the substrate can also be very low. The primary cost is the tag manufacturing process and the application of the tag to the end item.

Methods for fabricating the tag such as "strap-mounting" have been proposed by Alien Technology and Avery Denison. Self-assembly methods, such as that disclosed in the aforementioned patent have been also been proposed for tag manufacture. While these methods promise to reduce the cost of the tag itself, the cost of application to the end item is not addressed.

Figure 1:
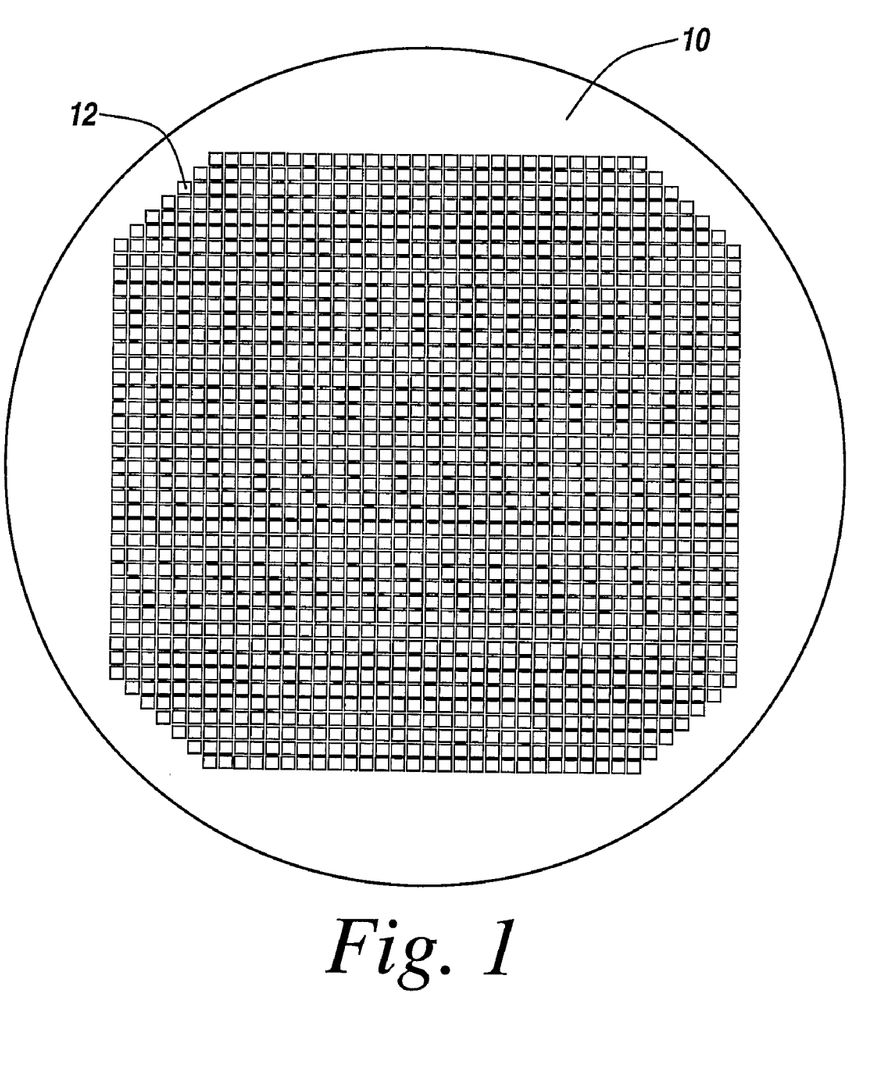
FIG. 1, illustrates a silicon wafer containing a huge number of microradios.
Figure 2:
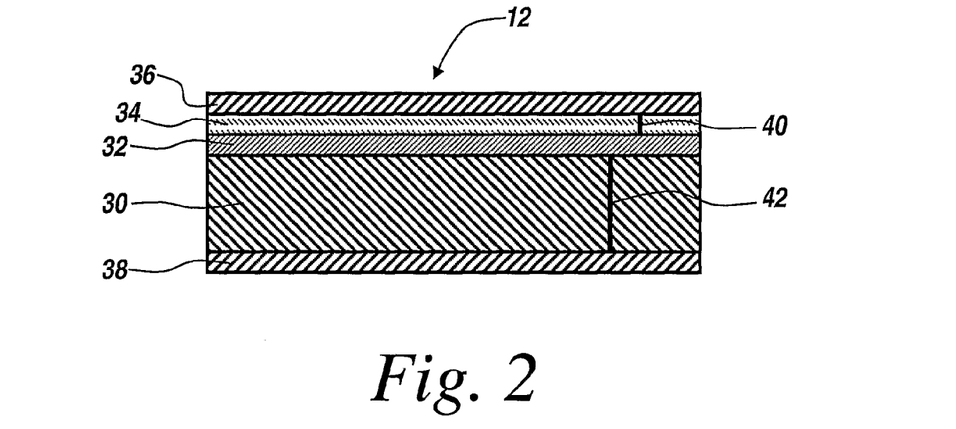
FIG. 2 illustrates a cross-section of the integrated circuit portion of the tag.

Referring now to FIG. 1, integrated circuit wafer 10 has a plethora of individual microradios 12 designed and fabricated according to techniques well know in the industry. FIG. 2 illustrates a cross-section of one of these microradios. Section 30 is the base semiconductor material, containing the circuitry in layer 32 (exaggerated in thickness in this drawing for clarity). Layer 32 is actually composed of several sub-layers of integrated circuit materials and conductive materials that are not shown in the figure. The top sub-layer of 32 may be an electrical shield as is common in integrated circuits.

In accordance with this invention, an electrically insulating layer 34 is applied over layer 32. On top of layer 34 is an electrically conductive layer 36 that is electrically connected to the appropriate part of the IC layer 32 by connection 40, serving as one connection to an antenna. The thickness and material of layer 34 are chosen to provide the correct RF properties to permit antenna connection 36 to function correctly.

Microradio 12 further has conducting layer 42 applied to the bottom side of die 12. This layer is connected to the appropriate part of IC layer 32 by connection 42, serving as the other connection to an antenna by a conductive layer 38. Connection 42, which traverses the bulk semiconductor material, is fabricated by one of several methods known in the industry, such as U.S. Pat. No. 6,836,020 "Electrical through wafer interconnects".

Figure 3:
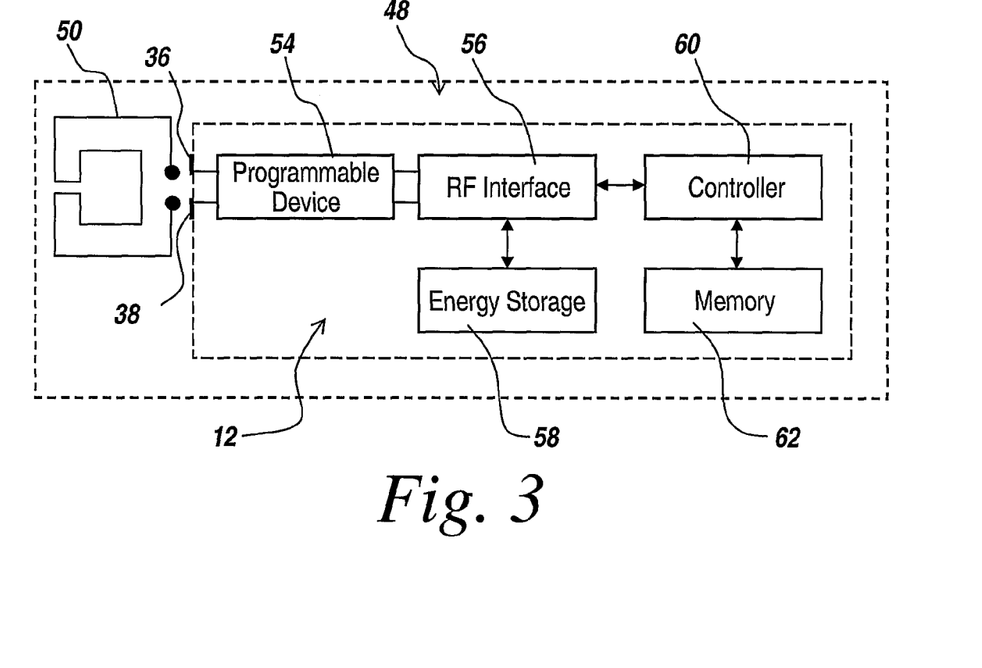
FIG. 3 is a block diagram of an RFID tag containing an antenna and a microradio.

FIG. 3 illustrates details of RFID tag 48, which is one of the subjects of this invention. Antenna 50, designed according to well-known principles, is responsive to RF energy in the chosen frequency band for the tag. As described below, this antenna is fabricated using electrically conductive ink. IC Die 12 with conductive surfaces 36 and 38 contains programmable device 54 together with RF interface 56, energy storage device 58, controller 60 and memory 62. The functions of the RF interface, energy storage, controller and memory are typical of passive RFID tags and will also be discussed below.

Figure 4:
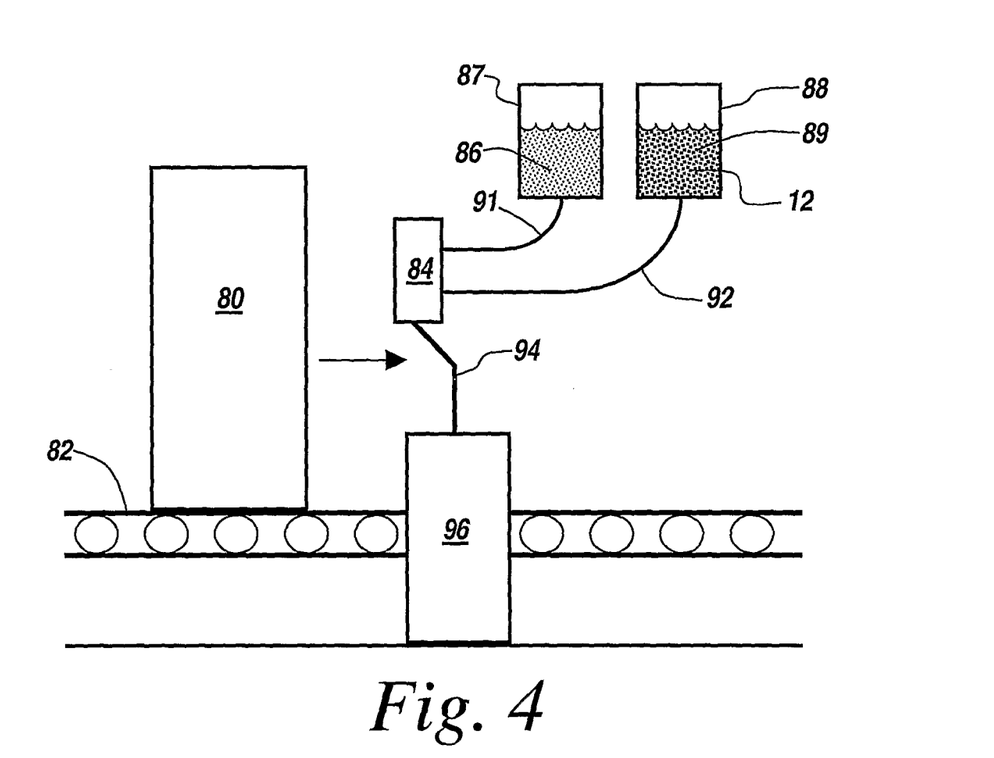
FIG. 4 is a block diagram of the system used to manufacture the RFID tag and apply it to an item.

FIG. 4 illustrated the method of manufacture of the tag. In this example, the tag is printed directly onto the end item. End item 80 is shown on a conveyor 82, moving past printer head 84. Printer head 84 is mounted on adjustable arm 94 and base 96, which may contain control electronics. Conductive ink 86 is held in reservoir 87, which is connected to print head 84 by conduit 91. Reservoir 88 contains a mixture of microradios 12 suspended in nonconductive fluid 89. Reservoir 88 is connected to print head 84 by conduit 92. As item 80 moves past print head 84, antenna 50 is first printed onto end item 80 using conductive ink 86. More than one microradio is then dispensed from print head 84 into the drying ink and in the correct location with respect to antenna 50, where one or more of the contacts will be embedded in the drying ink and thus be connected to the antenna. A second portion of conductive ink 86 is then applied over microradios 12 to complete the electrical connection to antenna 50 by connecting another contact to another portion of the antenna. Note that layer 100 floats on top of liquid 89 and is not miscible with the nonconducting fluid. It will be appreciated that the same result could be achieved by moving arm 94 over a stationary end item 80.

Figure 5:
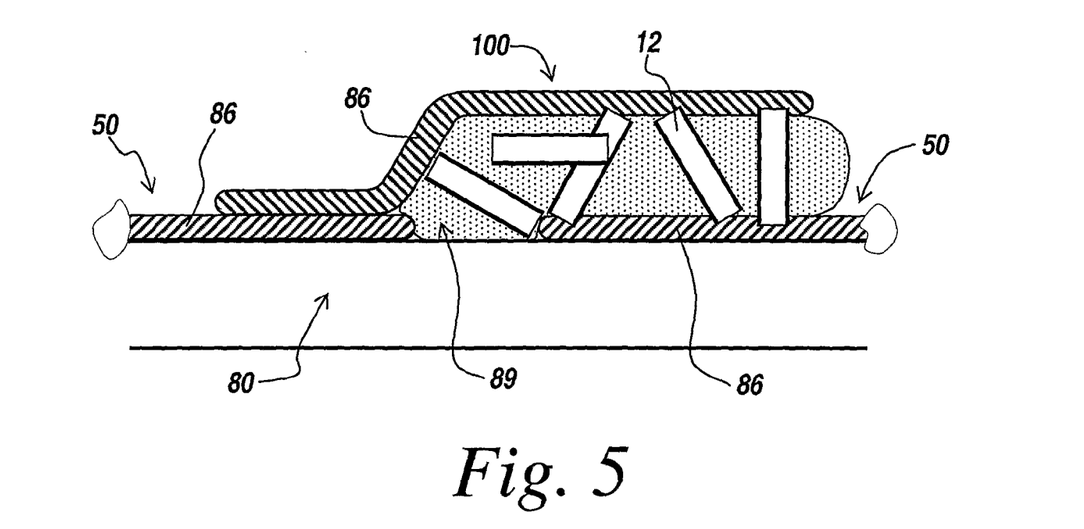
FIG. 5 is a cross-section of the RFID tag in the region of the antenna containing microradios.

FIG. 5 illustrates a cross-section of the tags in the region of antenna 50 where several microradios 12 are located, which will serve to clarify the manufacturing process described in FIG. 4. Antenna 50 is applied to end item 80 with conductive ink 86. Microradios 12 are dispersed in nonconductive fluid 89. Electrical connection between the microradios and antenna 50 is then established by conductive ink layer 100.

Figure 6:
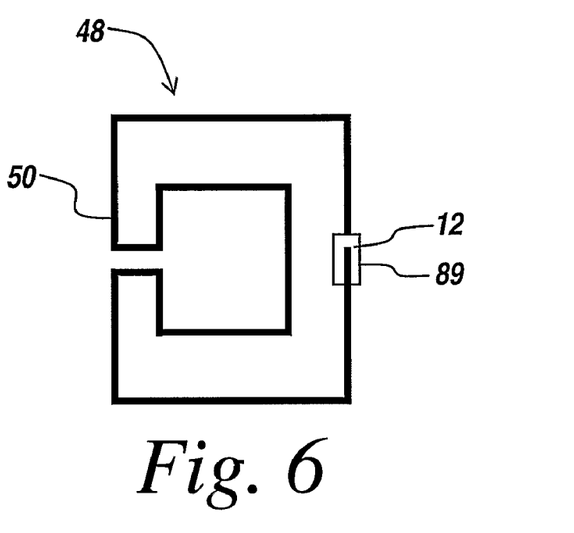
FIG. 6 is a diagram of the completed RFID tag.

FIG. 6 illustrates the final form of tag 48, consisting of printed antenna 50 and a plurality of microradios 12. Antenna 50 is typically composed of a 10- to 20-μm thick layer of electrically conductive ink with a typical resistance of 20 to 50 mOhms/square.

It will be appreciated that end item 80 could be replaced by a separate substrate with an adhesive backing to form a more conventional tag that could subsequently be applied to an end item.

Furthermore, it will be appreciated that some of the microradios 12 may be correctly connected between antenna 50 and layer 100; however, many will be either shorted out by conductive fluid or not connected at all. More importantly, some of the microradios that are connected may have electrode 36 connected to layer 100 and some may have electrode 38 connected to this layer. This creates a situation wherein these two forms of connect compete with each other or in some cases cancel each other out completely.

Now referring back to FIG. 3, programmable device 54 is used to select one connection and disconnect the other, thus providing a workable tag. This programmable device may be a simple fuse and diode in one preferred embodiment. For integrated circuit design considerations, it may be preferable to use an anti-fuse approach instead. Other programmable elements, for example, one that automatically recognizes the correct connection may be used.

Figure 7:
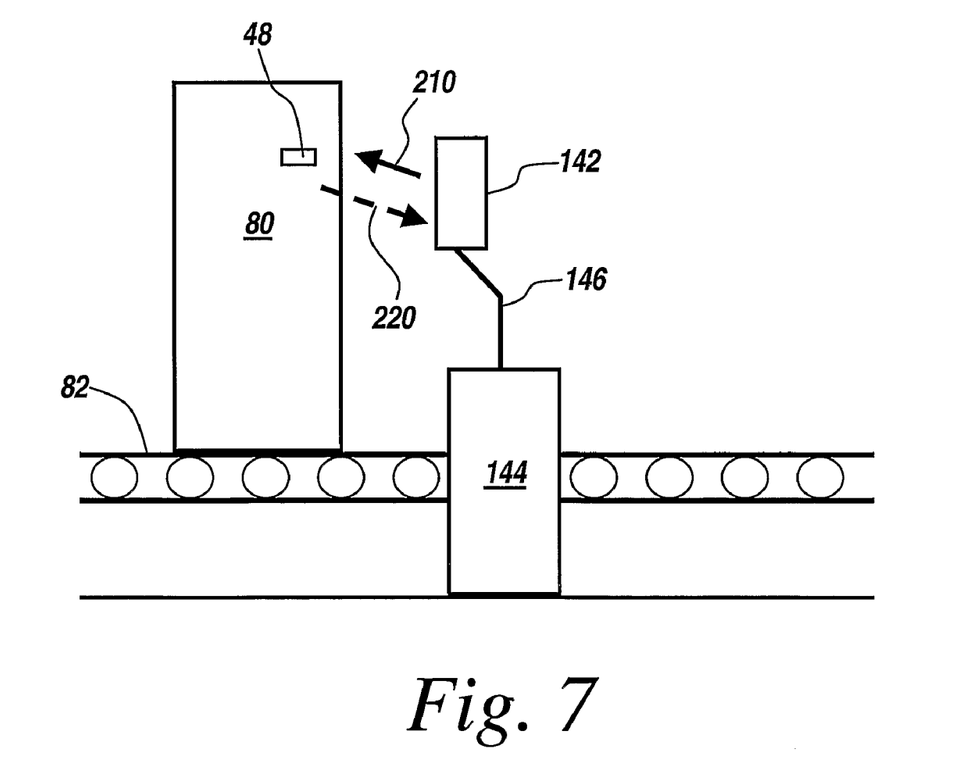
FIG. 7 illustrates the RFID tag passing through a programming station.

FIG. 7 illustrates the method of programming device 54. In the preferred embodiment discussed above, end item 80 with tag 48 applied is moved past programming head 142, which is mounted on adjustable arm 146 on base 144.

In the fuse version of programmable device 54, a unipolar voltage pulse is applied between antenna 50 and conductive layer 100. For microradios oriented in the correct direction or polarity, the diode will not conduct and the fuse remains intact enabling the circuit. For microradios that are incorrectly oriented, the diode conducts and the fuse blows out creating an open circuit disabling the circuit function.

An additional benefit of programming head 142 is the ability to program tag 48 in the same operation using well-known techniques. Shown is RF energy 210, transmitted by programming head 142 and received by tag 48. Now referring back to FIG. 3, the functions of the components of die 12 will be clarified. Antenna 50 intercepts a portion of RF energy 210, where it is sent through programmable device 54, which is now in a state to correctly pass the energy to the RF interface 56. The RF interface causes energy storage device to charge up. This combination of antenna and RF interface is known in the industry as a rectenna. When sufficient voltage has been achieved in the energy storage device, the rest of the IC is able to function. Data specific to end item 80 is sent to controller 60 and stored into memory 62.

Figure 8:
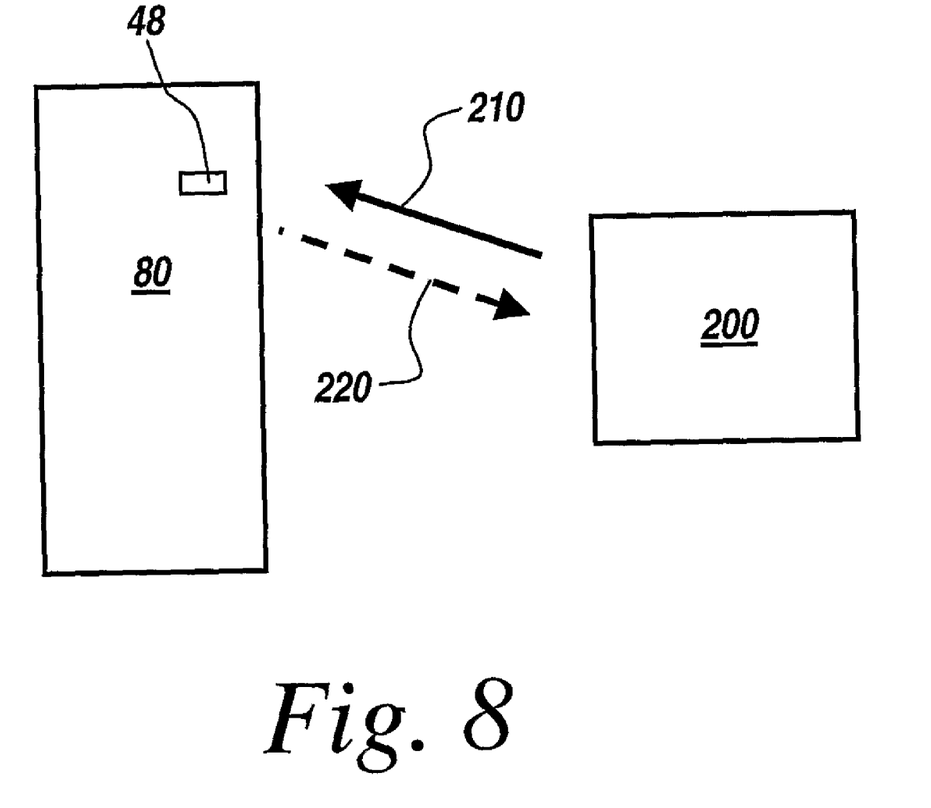
FIG. 8 illustrates the RFID tags being interrogated by a reader.

Finally, as shown in FIG. 8, end item 80 with applied tag 48 may be queried by a conventional reader 200. The rectenna charge energy storage device 58 in the same way it did during programming. Now, however, controller 60 queries memory 62 and send the stored data back to the RF interface, where it is sent through antenna 50 to reader 200.

In applications where additional data is to be added to tag 140 during transit, the same process used to program the tag may be used to store new information.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. An RFID tag comprising:
a receptorless substrate;
an antenna having feedpoints on the substrate; and,
multiple randomly oriented RFID integrated circuit chips contained in a fluid deposition medium and deposited onto said substrate, at least one of the randomly oriented RFID chips having contacts aligned with the feedpoints of the antenna through no alignment procedure in which a chip is forced to be oriented to contact the antenna feedpoints, and at least one chip coupled to the feedpoints of said antenna as a result of the deposition.

2. A method for manufacturing an RFID tag comprising:
fabricating an antenna having feedpoints on a receptorless substrate;
depositing a fluid carrying multiple unaligned randomly oriented RFID integrated circuit chips on the substrate;
electrically connecting at least one of the unaligned randomly oriented RFID integrated circuit chips to the antenna by way of said depositing; and,
programming the RFID integrated circuit chip.

3. The method of claim 2, wherein the antenna fabricating step includes the step of printing an antenna on the receptorless substrate.

4. The method of claim 2, wherein the printing step includes utilizing conductive ink.

5. The method of claim 2, wherein the at least one RFID integrated circuit chip is carried in a nonconductive fluid.

6. The method of claim 5, wherein the step of electrically connecting the at least one RFID integrated circuit chip to the antenna includes the steps of providing that the RFID integrated circuit chip have electrically conductive tabs at opposite ends thereof, providing the antenna with a first region at the feed point thereof, coupling one end of the at least one RFID integrated circuit chip to this first region and further including providing a second portion for the feed point for the antenna and electrically coupling the second portion feed point of the antenna to the opposite end of the at least one RFID integrated circuit chip.

7. The method of claim 6, wherein the step of electrically connecting the at least one integrated circuit to the antenna includes the step of overlying the second portion of the antenna feed with a conductive layer that floats on the non-conductive fluid such that the opposite end of the RFID integrated circuit chip that projects above the top surface of the nonconductive fluid is contacted by the overlying conductive layer.

8. The method of claim 2, wherein the programming step includes programming only those integrated circuits that are properly coupled to the antenna.

9. The method of claim 8, wherein the RFID integrated circuit chips have an energy storage unit and wherein the programming step includes initially providing RF energy through the antenna to the RFID integrated circuit chips to charge up the energy storage units in the RFID integrated circuit chips, such that only those REID integrated circuit chips that are properly coupled to the antenna transfer enough of the RF energy to power the RFID integrated circuits thereof, whereby only those RFID integrated circuit chips that are properly coupled to the feed point of the antenna receive enough power to be able to program the associated RFID integrated circuit chip, the other RFID integrated circuit chips that are not properly coupled receiving insufficient power and therefore are un-activated.

10. A method of manufacturing RFID tags, comprising the steps of:

printing an RFID antenna having antenna feedpoints on a receptorless substrate utilizing a conductive fluid; and, depositing a multiplicity of unaligned randomly oriented RFID integrated circuit chips in a nonconductive fluid at the feedpoints of the antenna, with at least one of the RFID integrated circuit chips at the feedpoints oriented and coupled to the antenna without any alignment procedure in which a chip is forced to be oriented to contact the antenna feedpoints by way of said depositing, whereby at least one RFID integrated circuit chip is properly oriented and coupled to the antenna without the need for individual RFID integrated circuit chip orientation, alignment and placement at the antenna feedpoints.

11. A method for reducing the cost of RFID tags, comprising the steps of:

manufacturing a large number of RFID integrated circuit chip microradios on a receptorless wafer patterned with a large number of randomly oriented microradios, thus to be able to manufacture large numbers of microradios from a single wafer to reduce the cost thereof;

providing a nonconductive fluid with a portion of said randomly oriented microradios carried therein such that they are unaligned;

providing an antenna with feedpoints on a receptorless substrate; and, depositing the unaligned microradios in the nonconductive fluid over the receptorless substrate at the feedpoints of the antenna such that at least one microradio is properly coupled to the feedpoints of the antenna by way of said depositing regardless of the random orientation of the microradios in the nonconductive fluid, whereby the cost of the tag is minimized due to the low cost of the microradios.

12. The method of claim 11, wherein the cost of the RFID tag is sufficiently low to be suitable for item-level tagging.

13. The method of claim 11, wherein each microradio has conductive tabs in three dimensions at either end of the microradio such that when randomly oriented in the nonconductive fluid at least some of the conductive tabs will be in the appropriate position to contact the antenna feed point.

14. The method of claim 11, wherein the depositing step includes the step of printing the nonconductive fluid carrying microradios onto said receptorless substrate onto which an antenna having feedpoints has been formed, and further including the step of connecting the at least one microradio to the feedpoints by overlying the nonconductive fluid with a printed conductive fluid that contacts the top portion of the nonconductive fluid and runs to a conductive portion of the antenna at the feedpoints thereof, the conductive fluid being non-miscible with the nonconductive fluid and floating on top thereof.

15. The method of claim 11, wherein the microradio is programmed in a programming step with an identification number.

16. The method of claim 15, wherein the programming step includes programming the microradio with information relative to the item to be tagged.

17. The method of claim 15, wherein the programming step includes providing each of the microradios with a fuse and a diode, providing a unipolar voltage to the microradios such that the unipolar voltage applied to a properly oriented microradio is such that the associated diode will not conduct and the fuse remains intact enabling programming the corresponding microradio; and such that for microradios that are incorrectly oriented the diode conducts and the fuse blows creating an open circuit to disable the power of the associated microradio.

18. A method for reducing the cost of RFID tags, comprising the steps of:

manufacturing a large number of RFID integrated circuit chip microradios on a wafer patterned with a large number of randomly thus to be able to manufacture a large numbers of microradios from a single wafer to reduce the cost thereof;

providing a nonconductive fluid with a portion of the randomly oriented microradios carried therein;

providing an antenna with a feed point on a receptorless substrate; and, depositing the nonconductive fluid over the substrate at the feed point of the antenna such that at least one microradio is properly coupled to the feed point of the antenna by way of said depositing regardless of the random orientation of the microradios in the nonconductive fluid, whereby the cost of the tag is minimized due to the low cost of the microradios, the microradio being programmed with an identification number, the programming step including providing each of the microradios with a fuse and a diode, and providing a unipolar voltage to the microradios such that the unipolar voltage applied to a properly oriented microradio is such that the associated diode will not conduct and the fuse remains intact enabling programming the corresponding microradio, and such that for microradios that are incorrectly oriented the diode conducts and the fuse blows creating an open circuit to disable the power of the associated microradio.

\* \* \* \* \*